United States Patent
Li et al.

(10) Patent No.: US 10,288,872 B2
(45) Date of Patent: May 14, 2019

(54) WAVELENGTH CONVERSION DEVICE, AND LIGHT SOURCE SYSTEM AND PROJECTION SYSTEM THEREFOR

(71) Applicant: APPOTRONICS CORPORATION LIMITED, Shenzhen (CN)

(72) Inventors: Qian Li, Shenzhen (CN); Yanzheng Xu, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 45 days.

(21) Appl. No.: 15/028,928

(22) PCT Filed: Oct. 8, 2014

(86) PCT No.: PCT/CN2014/088123
§ 371 (c)(1),
(2) Date: Apr. 12, 2016

(87) PCT Pub. No.: WO2015/055089
PCT Pub. Date: Apr. 23, 2015

(65) Prior Publication Data
US 2016/0252722 A1    Sep. 1, 2016

(30) Foreign Application Priority Data
Oct. 15, 2013    (CN) .......................... 2013 1 0479838

(51) Int. Cl.
*G03B 21/20* (2006.01)
*H04N 9/31* (2006.01)
(Continued)

(52) U.S. Cl.
CPC ........ *G02B 26/008* (2013.01); *C09K 11/7774* (2013.01); *F21V 9/30* (2018.02);
(Continued)

(58) Field of Classification Search
CPC .............. G03B 21/204; G03B 21/2033; G03B 21/2013; H04N 9/315; H04N 9/3158; H04N 9/3161; H04N 9/3164
(Continued)

(56) References Cited

U.S. PATENT DOCUMENTS 8,872,208 B2    10/2014    Kawakami
2005/0001989 A1*    1/2005    Fujimori ................. H04N 5/74
                                                         353/57
(Continued)

FOREIGN PATENT DOCUMENTS

CN    101539270 A    9/2009
CN    102800791 A    11/2012
(Continued)

OTHER PUBLICATIONS

International Search Report in the parent PCT application No. PCT/CN2014/088123, dated Jan. 16, 2015.
(Continued)

*Primary Examiner* — Ryan D Howard
(74) *Attorney, Agent, or Firm* — Chen Yoshimura LLP

(57) ABSTRACT

Disclosed are a wavelength conversion device, and a light source system and a projection system therefor. The wavelength conversion device comprises a supporting structure and a plurality of wavelength conversion modules arranged together, each wavelength conversion module comprising a ceramic carrier and a phosphor material provided thereon. The supporting structure ensures that the plurality of wavelength conversion modules remain fixed relative to one another. The light source system and the projection system both comprise the present wavelength conversion device. The use of ceramic material as the carrier for the phosphor material enables high temperature resistance, and prevents detachment of the phosphor material due to deformation at
(Continued)

high temperatures. In addition, such a modular wavelength conversion device does not crack easily, and has a flexible design and shorter production cycle.

22 Claims, 6 Drawing Sheets

(51) Int. Cl.
    *G02B 26/00* (2006.01)
    *C09K 11/77* (2006.01)
    *G03B 33/08* (2006.01)
    *G02B 17/00* (2006.01)
    *F21V 9/30* (2018.01)

(52) U.S. Cl.
    CPC ......... *G02B 17/006* (2013.01); *G03B 21/204* (2013.01); *G03B 21/2066* (2013.01); *G03B 33/08* (2013.01); *H04N 9/3158* (2013.01)

(58) Field of Classification Search
    USPC .......................................................... 362/84
    See application file for complete search history.

(56) References Cited

U.S. PATENT DOCUMENTS

| | | | |
|---|---|---|---|
| 2011/0149549 A1* | 6/2011 | Miyake ..................... | F21V 7/22 |
| | | | 362/84 |
| 2012/0201030 A1 | 8/2012 | Yuan et al. | |
| 2013/0056775 A1 | 3/2013 | Kawakami | |
| 2013/0088689 A1 | 4/2013 | Lin et al. | |
| 2013/0163225 A1* | 6/2013 | Nakatsu ............... | G03B 21/204 |
| | | | 362/84 |
| 2014/0254133 A1* | 9/2014 | Kotter .................... | C09K 11/02 |
| | | | 362/84 |
| 2016/0266375 A1* | 9/2016 | Li .......................... | H05B 33/10 |

FOREIGN PATENT DOCUMENTS

| | | |
|---|---|---|
| CN | 203217148 U | 9/2013 |
| CN | 203489180 U | 3/2014 |
| CN | 203489181 U | 3/2014 |
| CN | 104100933 A | 10/2014 |
| JP | 2011-129354 A | 6/2011 |
| JP | 2012140479 A | 7/2012 |
| JP | 2012-185980 A | 9/2012 |
| JP | 2013-207049 A | 10/2013 |
| TW | 201245844 A | 11/2012 |

OTHER PUBLICATIONS

IPRP in the parent PCT application No. PCT/CN2014/088123, dated Apr. 19, 2016.
Chinese Office Action, dated Aug. 25, 2015, and Search Report dated Aug. 16, 2015, in a counterpart Chinese patent application, No. CN 201310479838.9.
Chinese Office Action, dated Apr. 1, 2016, and Supplemental Search Report dated Mar. 24, 2016, in a counterpart Chinese patent application, No. CN 201310479838.9.
Chinese Office Action, dated Oct. 25, 2016 in a counterpart Chinese patent application, No. CN 201310479838.9.
Japanese Office Action, dated Mar. 28, 2017 in a counterpart Japanese patent application, No. JP 2016-524001.
Japanese Office Action, dated Oct. 31, 2017 in a counterpart Japanese patent application, No. JP 2016-524001.
Supplementary European Search Report, dated Jun. 19, 2017 in corresponding application EP 14854101.4.
Korean Office Action, dated Jun. 8, 2017 in a counterpart application KR 10-2016-7012444.
Korean Office Action, dated Dec. 29, 2017 in a counterpart application KR 10-2016-7012444.

* cited by examiner

WAVELENGTH CONVERSION DEVICE, AND LIGHT SOURCE SYSTEM AND PROJECTION SYSTEM THEREFOR

BACKGROUND OF THE INVENTION

Field of the Invention

This invention relates to illumination and display technologies, and in particular, it relates to a wavelength conversion device, and related light source system and projection system.

Description of Related Art

Wavelength conversion methods which use solid state light sources such as laser diodes (LD) or light emitting diodes (LED) to generate an excitation light to excite wavelength conversion materials such as phosphors can generate high brightness light having wavelengths different from those of the excitation light. Such light generation techniques have the advantages of high efficiency and low cost, and have become a dominating technology for providing white light and monochromatic lights. The light source according to this technology includes an excitation light source and a wavelength conversion device, where the wavelength conversion device includes a reflective substrate and a phosphor material layer coated on the reflective substrate, as well as a drive motor to drive the reflective substrate to rotate, so that the light spot formed by the excitation light from the excitation light source on the phosphor layer acts on the phosphor layer along a circular path.

A common reflective substrate is a mirror-surface aluminum substrate, which is formed by an aluminum base and a high reflection layer stacked together. The high reflection layer is typically a high purity aluminum or high purity silver. The phosphor layer coated on the reflective substrate is typically formed by adhering phosphor particles with silica gel to form a plate shape. Because the thermal conductivity of silica gel is relatively poor, and it tends to become darkened in a high temperature environment, the overall device is not suitable for working with high power excitation light.

To improve the properties of the color wheel for high power applications, glass may be used to replace silica gel as the adhesive. However, the glass powder as adhesive needs to be sintering with the phosphor powder under high temperature to form the phosphor layer. The sintering temperature for glass powder is relatively high, often above 500 degrees C., so it is not suitable for metal substrates, in particular aluminum substrate, because the highly thermally conductive and thin metal plate may experience problems of softening, deformation, oxidization, high thermal expansion, etc. It also makes it difficult for the sintered phosphor layer to adhere to the substrate.

SUMMARY

The main technical problem solved by embodiments of the present invention is to provide a wavelength conversion device that can withstand high temperature and can maintain its structural stability, as well as related light source system and projection system.

An embodiment of the present invention provides a wavelength conversion device, which includes a support structure and a plurality of wavelength conversion modules arranged together, wherein each of the plurality of wavelength conversion modules includes a ceramic carrier and a phosphor material carried on the ceramic carrier, and wherein the support structure keeps the plurality of wavelength conversion modules in fixed positions relative to each other.

Preferably, the phosphor material carried by each ceramic carrier is a phosphor material that is excited to generate a monochromatic converted light.

Preferably, the phosphor materials carried by different ceramic carriers are the same, or different phosphor materials are carried by different ceramic carriers.

Preferably, the phosphor material in at least one of the wavelength conversion modules is coated on a surface of the ceramic carrier to form a phosphor layer.

Preferably, the phosphor layer further includes a first glass body that adheres the phosphor material together.

Preferably, the ceramic carriers are made of ceramic materials having thermal conductivities above 80 W/mK.

Preferably, a reflective layer is disposed between the phosphor layer and the surface of the ceramic carrier, wherein the reflective layer is a diffuse reflection layer which includes white scattering particles and a second glass body that adheres the white scattering particles together, or wherein the reflective layer is a total reflection film coated on the surface of the ceramic carrier.

Preferably, the total reflection film is a silver film or an aluminum film.

Preferably, at least one of the plurality of wavelength conversion modules includes a fluorescent ceramic piece formed by the ceramic carrier with the phosphor material dispersed inside.

Preferably, the fluorescent ceramic piece is YAG glass ceramic or sintered YAG ceramic piece.

Preferably, a bottom surface of the fluorescent ceramic piece is provided with a diffuse reflection layer which includes white scattering particles and a second glass body that adheres the white scattering particles together, or a total reflection film.

Preferably, the total reflection film is a silver film or an aluminum film.

Preferably, a metal protection film is provided over the total reflection film.

Preferably, the support structure includes a base plate, wherein the plurality of wavelength conversion modules are respectively affixed on one surface of the base plate, and wherein the phosphor materials is located on a side of each wavelength conversion module that is farther away from the base plate.

Preferably, the base plate is made of a metal, a metal alloy, or a composite material of metal and inorganic materials.

Preferably, the base plate includes a ring shaped groove, and wherein the plurality of wavelength conversion modules each has an arc shape and are arranged together in a ring shape inside the ring shaped groove.

Preferably, the plurality of wavelength conversion modules are affixed to the base plate by adhesion or soldering, and wherein an adhesive agent used for adhesion is an organic adhesive, a silver adhesive or a slurry of silica gel mixed with high thermal conductivity filling particles.

Preferably, the high thermal conductivity filling particles include one or more particles selected from a group consisting of aluminum oxide, aluminum nitride, boron nitride, yttrium oxide, zinc oxide, and titanium oxide.

Preferably, some different ones of the plurality of wavelength conversion modules are affixed to the base plate using different means.

Preferably, the wavelength conversion device further includes a drive mechanism for driving the support structure to move.

This invention also provides a light source system, which includes an excitation light source for generating an excitation light, and the above wavelength conversion device, wherein the phosphor materials of the wavelength conversion device are located on a light path of the excitation light to convert the excitation light into converted lights for output.

This invention also provides a projection system for forming images, which includes the above light source system.

Compared to conventional technologies, embodiments of the present invention have the following advantages:

1. Ceramic carriers are used to replace conventional mirror-surface metal plates. Because ceramic materials have higher melting temperatures than those of metals, they can withstand higher temperatures than metals. Also, the thermal resistance of the interface between the ceramic carrier and the phosphor materials is relatively low, so the heat generated by the phosphor materials can be conducted to the ceramic carrier and dissipated to the environment. This improves the thermal stability of the wavelength conversion device. Moreover, the thermal expansion coefficients of ceramics are relatively low, so they resist deformation even at high temperatures. Further, the thermal expansion coefficients of ceramics and the phosphor layer are close to each other, so even if there is a small amount of deformation, it does not affect the ability of the phosphor layer to adhere to the ceramic substrate.

2. Because ceramic materials have relatively low toughness and relatively high brittleness, for a wavelength conversion device where the carrier substrate for the phosphor materials is an integral ceramic piece, when it is illuminated by high intensity excitation light, the degrees of thermal expansion in inner and outer regions are large. Such non-uniform expansion can cause the ceramic to crack, which in turn can cause the color wheel to burst or break, and the color wheel will completely cease to function. In embodiments of the present invention, the ceramic carriers are divided into multiple pieces, which are then adhered to a support structure made of a metal, a metal alloy, or a composite material of metal and inorganic materials. Compared to the design of forming different phosphor materials on the same integral ceramic carrier, the chances of crack, break or burst are greatly reduced.

Also, after being divided into multiple pieces, the ceramic carriers have relatively small sizes, so the temperature change due to illumination of the excitation light during rotation is relatively uniform, and therefore less prone to cracking. Even if cracks form in a very low probability event, because it still has surface contact with and is adhered to the support structure, the wavelength conversion device can still function even with the crack. Moreover the material of the support structure makes the ceramic carriers less prone to cracking.

3. Fabrication complexity of the wavelength conversion device can be reduced and the production cycle can be shortened. On the same ceramic substrate, it is difficult to coat different phosphor layers in one pass using blade-coating, so different color phosphors need to be coated and sintered separately in multiple passes, making the production cycle long. For example, to form four phosphor layers, four cycles of coating and sintering are required.

In embodiments of the present invention, on the other hand, because different phosphors are contained in different wavelength conversion modules, which have relatively small sizes, it is easier to coat each of them using blade-coating. Also, different color phosphor layers can be sintered separately and concurrently, which shortens the production cycle. For example, to form four phosphor layers, only two sintering cycles are required in embodiments of the present invention.

4. Special processing is made easier. Using a large sized integral ceramic piece, when special processing is required, such as surface polishing, metal brazing, surface coating, etc., the larger the carrier size, the higher the processing difficulty.

In embodiments of the present invention, each ceramic carrier is smaller in size and the sizes can be adjusted based on need. Smaller sizes will reduce both the cost and difficulty of special processing.

5. The modular structure is more flexible, and facilitates the making of high quality wavelength conversion devices. When the reflective layer and the phosphor layers are all integrally formed on one ceramic substrate, when undergoing special processing (such as sintering, annealing, etc.), the properties and their limitations of each functional layer on the ceramic substrate must be considered (for example, a phosphor layer of red phosphor cannot withstand temperatures higher than 600 degrees C.); thus, when designing high performance color wheel with complex structures, the processing parameters have to be chosen by compromise due to these limitations, making it hard to achieve optimum result for each phosphor material and each processing technique.

In embodiments of the present invention, the different wavelength conversion modules can have sizes that are suitable for each phosphor material, and different reflective layers and heat conduction designs can be chosen as suitable for the different light emitting and heat generating properties of each phosphor, for example, ceramic with surface metal layer, thermal conductive filling particles, surface silver plating, etc. As a result, the modules for different colors can be fabricated under their respective optimum processing conditions without having to be concerned about the properties of other color modules. This is advantageous for achieving high quality color wheels.

6. It can reduce material use and lower cost. The modular wavelength conversion device design according to embodiments of the present invention also facilitates quality control of the products. For conventional color wheels, if one phosphor segment is defective, the entire color wheel has to be discarded. On the other hand, for wavelength convention devices according to embodiments of the present invention, if one wavelength convention module is defective, another module may be made as replacement, which lowers quality control cost.

DETAILED DESCRIPTION OF PREFERRED EMBODIMENTS

Embodiments of the present invention are described in detail below with reference to the drawings.

First Embodiment

Figure 1A:
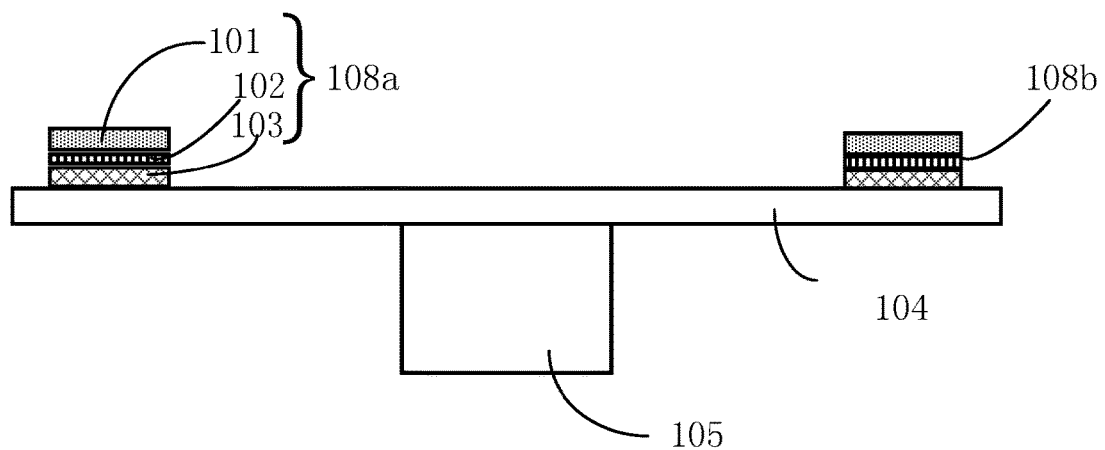
FIG. 1A is a partial cross-sectional view of a wavelength conversion device according to a first embodiment of the present invention.
Figure 1B:
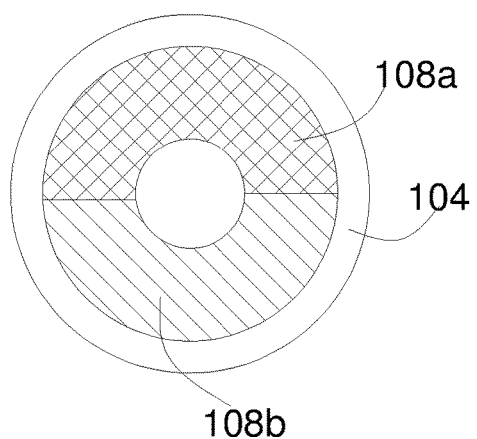
FIG. 1B is a top view of the wavelength conversion device of FIG. 1A.

Referring to FIGS. 1A and 1B, in this embodiment, the wavelength conversion device includes a support structure 104 and two wavelength conversion modules 108a and 108b. Each wavelength conversion module includes a ceramic carrier 103, and a phosphor layer 101 and a reflective layer 102 disposed on the ceramic carrier 103.

As shown in FIGS. 1A and 1B, the support structure 104 is a round base plate, preferably formed of a metal, a metal alloy, or a composite material of metal and inorganic materials. The metal may be aluminum, copper, silver, etc. The metal alloy may be brass, aluminum alloy, copper aluminum alloy, etc. The composite material of metal and inorganic material is a composite of metal and inorganic material, such as diamond-copper, boron nitride-copper, etc. The support structure has a ring shaped region which is centered on the center of the round base plate.

There are two ceramic carriers 103, respectively shaped like a half of a ring; they are arranged together on the ring shaped region of the base plate, to form a matching ring shape. Preferably, the ceramic carrier 103 is made of aluminum oxide, aluminum nitride, silicon nitride, silicon carbide, boron nitride, or beryllium oxide, all of which are ceramic plates with a dense structure, and not porous. The thermal conductivities of these materials are above 80 W/mK, and their melting points are mostly above 200 degrees C. Thus, these materials have good thermal conductivity and at the same time can withstand high temperature. Of course, in applications that do not place a high requirement on the thermal conductivity, other types of ceramic plates may be used as the ceramic carriers 103. It should be noted that the two ceramic carriers 103 may be made of the same material or different materials.

In practice, the bottom surface of the ceramic carriers may be adhered to the ring shaped region of the support structure using a high thermal conductivity adhesive, such as silver adhesive or a silica gel mixed with high thermal conductivity filling particles. The high thermal conductivity filling particles may be aluminum oxide, aluminum nitride, boron nitride, yttrium oxide, zinc oxide, or titanium oxide particles or a mixture of two or more of the above.

On the top surface of each ceramic carrier is a reflective layer 102, to reflect the converted light generated by the phosphor when illuminated by the excitation light. In this embodiment, the reflective layer 102 is a total reflection film, such as silver film, aluminum film, etc. The total reflection film can be formed by electroplating, chemical plating, electron beam sputtering, plasma sputtering, vapor deposition, etc. on the top surface of the ceramic carrier.

A phosphor material is provided on the reflective layer to form a phosphor layer 101, which is used to absorb the excitation light and emit a converted having a different wavelength than the excitation light. Examples of phosphor materials include YAG (yttrium aluminum garnet) phosphor, which absorbs blue light, ultraviolet light etc. to generates a yellow converted light; a red phosphor, which absorbs an excitation light to generate a red converted light; and a green phosphor which generates a green converted light, or other phosphors. In this embodiment, the ceramic carrier of one wavelength conversion module 108a carries a phosphor layer of a red phosphor, and the other wavelength conversion module 108b carries a yellow phosphor on one half of it and a green phosphor on the other half. Of course, combinations of other single color phosphors can be provided on any one of the ceramic carrier 103.

The phosphor layer 101 is an integral piece formed of a phosphor powder sealed by an adhesive. The adhesive may be a silica gen adhesive, which has stable chemical properties and high mechanical strength. But silica gel cannot withstand very high temperature, typically 300 degrees C. to 500 degrees C. For applications of high power light emitting devices, preferably, an inorganic adhesive is used to adhere the phosphor powder to form an integral piece; for example, it can use sodium silicate, glass powder, etc. which is sintered into a glass body, to obtain a reflective type phosphor wheel that can withstand high temperature. It should be noted that this invention does not exclude using silica gel as the adhesive for the phosphor powder; this is because due to the presence of the ceramic carrier, the heat generated by the phosphor layer can be rapidly conducted to the ceramic carrier and dissipated. Moreover, silica gel does not deform easily, so it has sufficient advantages over the conventional aluminum substrate.

Preferably, the phosphor layer 101 is formed by sintering a slurry that contains the phosphor powder and a first glass powder, where the first glass powder is sintered to form a first glass body. Glass powder is an irregularly shaped, particulate, homogeneous glass substance, which is highly transparent and has stable chemical properties. The glass powder may be one of silicate glass, lead silicate glass, aluminum borosilicate glass, aluminate glass, soda lime glass, or quartz glass, or a mixture of two or more of the above. The first glass powder may be one or more selected from the above glass powders. Because the first glass powder is required to have high transmission rate for the incident light and to have good thermal conductivity, preferably, the first glass powder is borosilicate glass powder, which has stable properties and high light transmission rate, and has a relatively high thermal conductivity compared to other glass powders. Of course, based on the heat resistance of different phosphors, glass powders of different softening point may be selected accordingly.

The drive mechanism 105 is fixed to the support structure 104, to drive the support structure 104 and in turn the wavelength conversion modules 108a and 108b to rotate around the center of the round plate. As a result, the excitation light periodically illuminates the various positions along the ring shaped phosphor plate 101. In this embodiment, the drive mechanism 105 is a motor.

In this embodiment, the ceramic carrier 103 includes two pieces, each piece and the corresponding reflective layer 102 and phosphor layer 101 form a wavelength conversion modules 108a/108b. Multiple wavelength conversion modules are arrange together, and adhesively fixed to the support structure 104. Such a modular structure has significant advantages over an integral structure which uses one piece of ceramic material to form the entire substrate and have different phosphor materials on the ceramic substrate.

This is because when the entire substrate is formed of one piece of ceramic material, when the phosphor layer is illuminated by a high intensity excitation light, the area of the ceramic substrate that is in contact with the phosphor layer will have a relatively high temperature, while other areas will have a relatively low temperature, so different areas of the ceramic substrate will have different degrees of thermal expansion. Because ceramic materials have relatively low toughness and relatively high brittleness, such different degrees of thermal expansion may cause the substrate to crack.

In this embodiment, on the other hand, because the ceramic carriers are separate pieces, the interference among different regions due to high temperature is reduced. The heat of each ceramic carrier is separately conducted to the support structure to be dissipated, which prevents the situation where one region has a crack and the entire wavelength conversion device cannot function properly. In addition, by dividing them into pieces, each ceramic carrier is relatively small, so the illumination light spot can approximately cover the entire ceramic carrier, so heating is more uniform. Even if one ceramic carrier cracks in a very low probability event, only one carrier needs to be replaced. In the above embodiment, the ceramic carriers include two pieces; clearly they can be divided into multiple same shaped or different shaped arc shaped pieces, without limitation. Here "multiple pieces" means two or more pieces.

Also, the support structure is formed of metal, metal alloy, or a composite material of metal and inorganic materials, which have high toughness and strength. Ceramic carriers are only provided in the ring shaped region of the support structure where the phosphor layer is required, and the phosphor is formed on the ceramic carriers, so that each ceramic carrier is uniformly heated, greatly reducing the probability of cracking of the ceramic carriers due to large differences of thermal expansion in different positions. Even if the ceramic carrier cracks in a very low probability event, because it still has surface contact with and is adhered to the support structure, the wavelength conversion device can still function even with the crack, thereby extending the life of the wavelength conversion device. Further, the base plate has good thermal conductivity, so the contact between the ceramic carriers and the base plate promotes heat dissipation of the ceramic carriers.

Moreover, because the wavelength conversion device is driven by the drive mechanism to rotate around the central axis, different positions of the phosphor layer periodically pass through the optical path of the excitation light and are excited by the excitation light. Thus, the phosphor layer at each position is only momentarily excited by the excitation light when it passes through the optical path of the excitation light, so the illumination time is short, and the temperature of the phosphor layer is greatly reduced and its efficiency is greatly improved.

Second Embodiment

Figure 2:
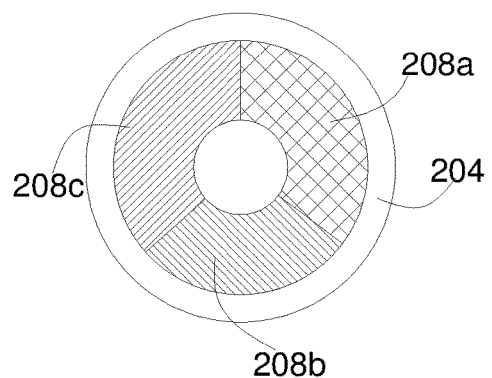
FIG. 2 is a top view of a wavelength conversion device according to a second embodiment of the present invention.

As shown in FIG. 2, in this embodiment, the support structure 204, drive mechanism, ceramic carriers, adhesives, reflective layers and phosphor layers are similar to those in the first embodiment and detail descriptions are omitted here.

A difference between this embodiment and the first embodiment is that, there are three wavelength conversion modules 208a, 208b and 208c, each having an arc shape; they are arranged on and adhered to a ring shaped region of the support structure 204 to form a ring shape. Moreover, the phosphor material in the phosphor layer on each ceramic carrier is a monochromatic phosphor that is excited to emit a converted light of one color, and different colored phosphor materials are provided on different ceramic carriers.

For example, as shown in FIG. 2, the phosphor materials on the three wavelength conversion modules 208a, 208b and 208c are respectively red phosphor, yellow phosphor and orange phosphor. The sequence of the three phosphors can be arranged according to need, and the colors of the single color phosphors can be selected and combined as needed. Also, one color phosphor material may be provided on two ceramic carriers. More generally, the number of ceramic carriers may be more than three, and different choices of color, sequence and distribution of the phosphors are possible.

An advantage of this embodiment over the first embodiment is that different color phosphors are located on different ceramic carriers. Different phosphors, along with the same or different first glass powder used for each phosphor, use different processing conditions when sintering to form the phosphor layers. For example, because red phosphor and orange phosphor have poorer temperature resistance, lower temperature glass powders having lower softening point should be used even though they have slightly poorer light transmission rate, so sintering may be done at a lower temperature. Yellow phosphor and green phosphor have better temperature resistance, so glass powders having higher softening points and higher light transmission rates may be used, and sintering may be done at higher temperatures.

If red phosphor and yellow phosphor layers are sintered onto the same ceramic substrate, the phosphor layers need to be sintered separate times at different sintering temperatures; thus, the ceramic substrate will be heated multiple times, which is unfavorable for the stability of the ceramic substrate.

Using this embodiment, on the other hand, because different wavelength conversion modules containing different color phosphors are separately and individually fabricated, and the modules are then adhered to the support structure, production cycle can be shortened significantly.

Meanwhile, for each module, based on the phosphor it contains and the glass powder, reflective layer, and ceramic carrier of the module, a fabrication process can be designed to achieve optimum results for the module without limitations imposed by the phosphors or other components of the other modules.

Third Embodiment

In this embodiment, except for the reflective layer, the other components are similar to those of the first and second embodiments, and detailed descriptions are omitted here.

A difference between this embodiment and the first and second embodiments is that for the reflective layer, a diffuse reflection layer replaces the total reflection film.

The diffuse reflection layer is located between the phosphor layer and the ceramic carrier, and includes white scattering particles, which function to scatter the incident light. The white scattering particles are typically a powder of a salt or an oxide, and the particle size ranges from 50 nanometers to 5 microns. Examples include aluminum oxide, titanium oxide, aluminum nitride, magnesium oxide, boron nitride, zinc oxide, zirconium oxide, barium sulfate, etc. which are ultra-white single powder particles, or a mixture of two or more of the above powder particles. These white scattering material absorbs virtually no light, and are stable and will not oxidize or decompose under high temperature. Considering that the diffuse reflection layer should have good reflectivity and heat dissipation property, a preferred choice is aluminum oxide powder which has desirable properties overall.

To achieve sufficient reflection of the incident light, the white scattering material in the diffuse reflection layer should have sufficient density and thickness, and the particle size distribution should be in an appropriate range. The smaller the particle size and the denser the packing, the better the scattering effect. On the other hand, it is easy to understand that, for the same white scattering particles, the higher the ratio of the particles in the layer and the thicker the diffuse reflection layer, the higher the reflectivity. However, when the diffuse reflection layer is too thick, its thermal resistance will be too high; thus the thickness should be within an appropriate range. The density and thickness can be determined through experimentation.

In one example, a diffuse reflection layer of aluminum oxide powder is formed on the surface of an aluminum nitride ceramic carrier, where the thickness of the diffuse reflection layer is 0.1-1 mm, the particle size distribution is 0.1-1 μm, and the weight ratio of the aluminum oxide powder to the adhesive agent is 1:1 to 10:1. Based on experiments, such a diffuse reflection layer has a reflectivity that is up to 99.5% of that of the of mirror-surface aluminum substrate, i.e., its reflectivity is almost as high as that of mirror-surface aluminum substrate. Of course, the particle size of the scattering particles, and the thickness and density of the diffuse reflection layer can be other values, which can be determined by those skilled in the art through routine experimentation.

Similarly, the white scattering powder is adhered together by an adhesive to form an integral piece. The adhesive may be silica gel, sodium silicate, etc. Preferably, the white scattering particles are sintered with a second glass powder, where the second glass powder is sintered into a glass body to adhere the white scattering particles. Here, the choices of the second glass powder may be the same as those of the first glass powder in the first embodiment. The second glass powder and the first glass powder may be the same or different glass powders.

The diffuse reflection layer may be affixed to the ceramic carrier using an adhesive. However, when using an adhesive, the existence of the adhesive means that there is an intermediate layer between the diffuse reflection layer and the ceramic carrier, which may hinder the heat conduction from the diffuse reflection layer to the ceramic carrier. Thus, preferably, the diffuse reflection layer is directly sintered to the ceramic carrier, so that the bonding between the ceramic carrier and the diffuse reflection layer is strong, and thermal conductivity is high. Meanwhile, the matching of the thermal expansion coefficients of glass and ceramics is better than the matching of the thermal expansion coefficients of glass and metal. Further, because the ceramic carrier has relatively high thermal conductivity coefficient, it can conduct heat well, like a metal substrate.

It is noted that when the diffuse reflection layer is first formed on the ceramic carriers and then the phosphor layer is formed on the surface of the diffuse reflection layer by sintering, to prevent the sintering process from adversely impacting the diffuse reflection layer, the sintering temperature for the phosphor layer is preferably lower than the softening point of the second glass powder. Thus, the softening point of the second glass powder should be higher than that of the first glass powder. Similarly, when the phosphor layer is formed first and then the diffuse reflection layer is formed on the surface of the phosphor layer by sintering, the sintering temperature is preferably lower than the softening point of the first glass powder, and the softening point of the second glass powder should be lower than that of the first glass powder. Also, because the softening points of the first and second glass powders should be different, and borosilicate glass powder has a higher softening point, this glass powder may be used as the one of the first and second glass powders that has a higher softening point.

An advantage of this embodiment over the first and second embodiments is that it uses a diffuse reflection layer to replace the total reflection film, and uses the diffuse reflection layer combined with the ceramic carrier to replace conventional mirror-surface metal plate. The diffuse reflection layer formed of the scattering particles scatters the incident light and can achieve a similar or even the same result as mirror reflection.

Further, white scattering particles will not change their color and property due to oxidation, decomposition or other reactions under high temperature so will not reduce its reflection of the incident light. Thus, a diffuse reflection layer can withstand relatively high temperatures. Meanwhile, because the melting point of the ceramic material is higher than that of metal, it can withstand higher temperatures than metal, so that even after prolonged operation under high temperature, it still does not suffer significant oxidation, softening or other property changes. Thus, it can replace conventional metal substrate and reflective surface.

In the diffuse reflection layer the second glass powder adheres the white scattering particles; it can insulate the white scattering particles from the atmosphere, to prevent the white scattering particles from becoming damp in the air. It can also increase the strength and light transmission rate of the diffuse reflection layer. Further, when the adhesive of both the phosphor layer and the diffuse reflection layer are glass powders, the phosphor layer can be sintered on the surface of the diffuse reflection layer, or the diffuse reflection layer can be sintered on the surface of the phosphor layer, so that the two layers have a high bonding force and can withstand relatively high temperature.

In addition, in a conventional aluminum substrate with a phosphor layer on its surface, the surface of the substrate is smooth, so when the phosphor layer is formed on the mirror-surface of the aluminum substrate, the contact interface between the phosphor layer and the mirror-surface aluminum substrate will shrink, and the phosphor layer may be partially separated from the substrate. This reduces the contact interface area between the phosphor layer and the mirror-surface aluminum substrate, so the thermal resistance between the phosphor layer and the mirror-surface of the aluminum substrate is relatively high. For a wavelength conversion device using ceramic carriers, on the other hand, because both the ceramic carrier and the diffuse reflection layer have a rough surface, the contact interface areas between the phosphor layer and the diffuse reflection layer and between the diffuse reflection layer and the ceramic carrier are relatively large, so the thermal resistance of the interface between the ceramic carrier and the phosphor materials is relatively low, and the heat generated by the phosphor materials can be effectively conducted to the ceramic carrier, so that the wavelength conversion device can withstand higher temperature.

Fourth Embodiment

Figure 3:
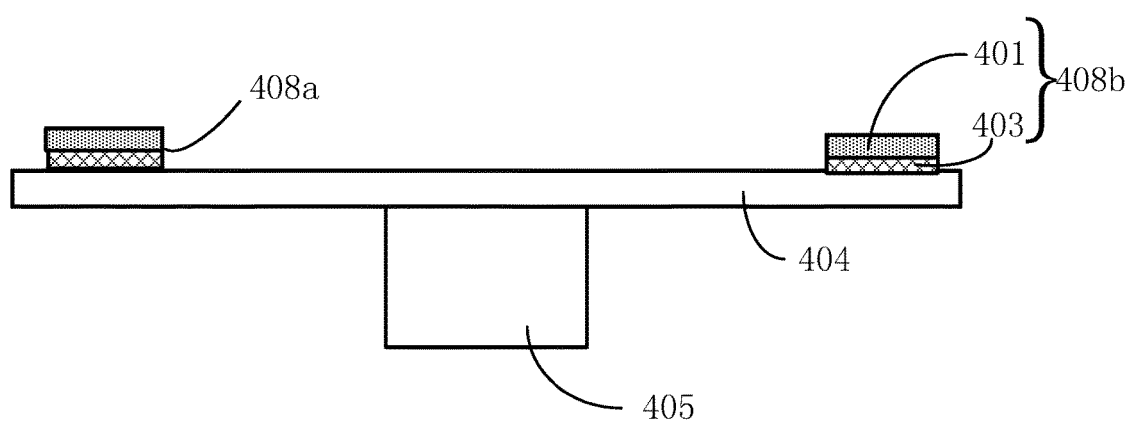
FIG. 3 is a partial cross-sectional view of a wavelength conversion device according to a fourth embodiment of the present invention.

As shown in FIG. 3, this embodiment includes four wavelength conversion modules (two of them, 408a and 408b, are shown in the drawings and the other two are not shown) and the support structure 404. The four wavelength conversion modules are arranged in a ring shape and affixed on a ring shaped region of the surface of the support structure 404. The support structure 404 is similar to that of the first to third embodiments.

Each wavelength conversion module includes a fluorescent ceramic piece 401 and a reflective layer 403, and the reflective layer 403 is disposed between the fluorescent ceramic piece 401 and the surface of the support structure 404. The fluorescent ceramic piece 401 includes a ceramic carrier and a phosphor material dispersed within the ceramic carrier. In other words, the ceramic carrier and phosphor layer in each wavelength conversion module in the first to third embodiments are combined into one component here. The fluorescent ceramic piece 401 is a ceramic body that can be excited by the excitation light to generate a converted light, such as YAG glass ceramics, sintered YAG ceramics, or other systems of yellow, green or red fluorescent ceramics. The fluorescent ceramic piece 401 of each wavelength conversion module may be the same type of fluorescent ceramic, or different colors or different types of fluorescent ceramic as needed.

In this embodiment, the reflective layer 403 is a total reflection film having high reflectivity, such as silver film, aluminum film, etc. Preferably, the total reflection film can be deposited on the bottom surface of the fluorescent ceramic piece by a coating technique, such as electroplating, chemical plating, electron beam sputtering, plasma sputtering, vapor deposition, etc.

Further, a metal protection film may be coated over the reflective layer 403 on the fluorescent ceramic piece 401, using one of the coating methods mentioned above. The metal protection film may be a metal such as Ti, Ni, Cu, Al, or Mo, or a mixed film of two or more of the above metals. Or, the film may be a composite film formed by alternating coatings of multiple metals. The function of the metal protection film is to protect the reflective layer as well as to facilitate adhesion with the base plate.

The coated fluorescent ceramic pieces 401 are arranged and affixed to the base plate of the support structure 404 using adhesion or soldering. If using adhesion, the adhesive may be the same type of adhesive used in the first embodiment to adhere the ceramic carriers to the support structure. If using soldering, preferably, low temperature vacuum brazing is used. This can reduce the air cavities and thickness of the soldering layer, which enhances heat conduction.

Of course, the reflective layer 403 in this embodiment may also be a diffuse reflection layer containing white scattering particles as described in the third embodiment. When forming a diffuse reflection layer on the surface of the support structure 404, preferably, the white scattering particles are adhered together using a silica gel, to increase the bonding between the diffuse reflection layer and the support structure 404. Alternatively, the reflective layer 403 may have other structures, as long as it can effectively reflect the incident light.

An advantage of this embodiment over the first to third embodiment is that, by using a fluorescent ceramic piece that has a dense structure and high thermal conductivity to replace the structure of a ceramic carrier with a phosphor layer adhered to it, the structure of the device is simpler and the fabrication process is simplified, which reduces material and processing cost.

Also, because fluorescent ceramics have a dense structure, air cannot penetrate the fluorescent ceramic piece to react with the reflective layer, which improves the stability of the reflective layer. Moreover, fluorescent ceramics have very high thermal conductivity, and are more suitable for illumination by a high power excitation light.

Fifth Embodiment

A difference between this embodiment and the fourth embodiment is that in this embodiment, of the four wavelength conversion modules, three of them are replaced by the module structure of the third embodiment, i.e. a ceramic carrier with a diffuse reflection layer and a phosphor layer sequentially adhered to it. It should be understood that it is also possible to replace only two of the wavelength conversion modules, or the number of replaced modules may be any number above two, and the number of each type of wavelength conversion modules can be any suitable numbers based on need.

In the descriptions below, the various components and their structure and relationship with each other are similar to the earlier described embodiments; only the differences from the earlier embodiments are described here.

Figure 4A:
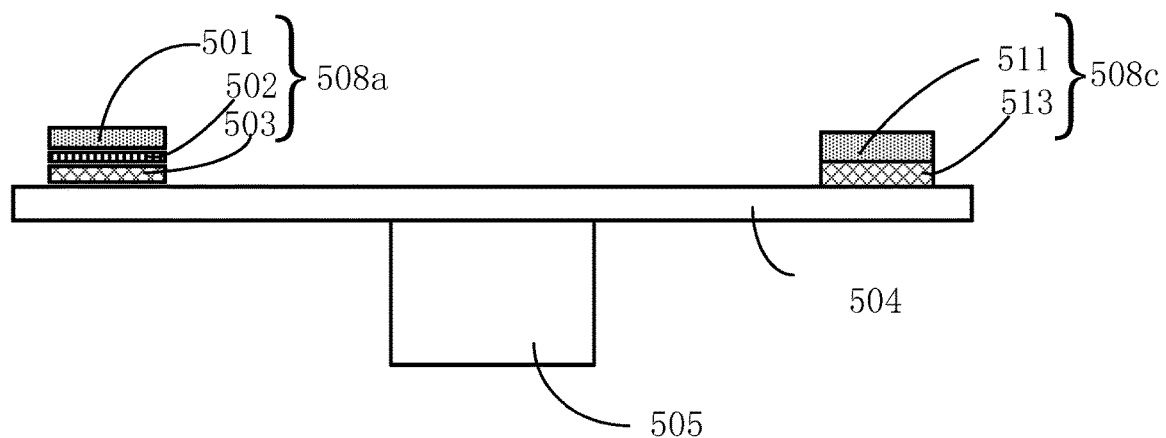
FIG. 4A is a partial cross-sectional view of a wavelength conversion device according to a fifth embodiment of the present invention.
Figure 4B:
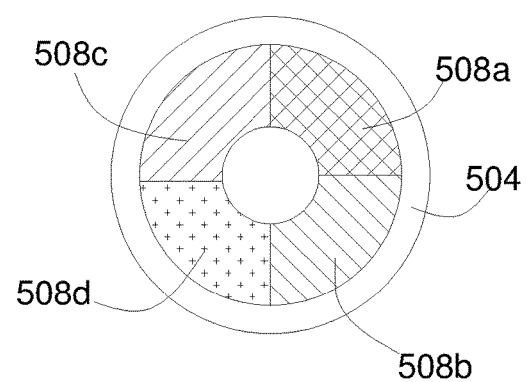
FIG. 4B is a top view of the wavelength conversion device of FIG. 4A.

As shown in FIGS. 4A and 4B, wavelength conversion modules 508a, 508b, 508c and 508d are affixed to the surface of the support structure 504 using adhesion or soldering. The drive mechanism 505 drives the support structure 504 and the various wavelength conversion modules to rotate together.

In this embodiment, each of wavelength conversion modules 508a, 508b and 508d includes a ceramic carrier 503 with diffuse reflection layer 502 and phosphor layer 501 sequentially adhered to its surface, similar to the corresponding structure in the third embodiment. Among them, wavelength conversion module 508a uses an orange phosphor as the color phosphor material, wavelength conversion module 508b uses a green phosphor, and wavelength conversion module 508d uses a red phosphor. As mentioned earlier, different color phosphors have different temperature resistance properties; correspondingly, different first glass powders, ceramic carriers and sintering processes are used for these different wavelength conversion modules based on need.

Wavelength conversion module 508c includes a fluorescent ceramic piece 511 with a total reflection film 513 on its surface, similar to the corresponding structure in the fourth embodiment. In this embodiment, the fluorescent ceramic piece 511 is a YAG glass ceramic which can be excited to generate a high brightness yellow light.

The four wavelength conversion modules are fabricated using their respective optimum processing conditions, and are then respectively affixed on one surface of the support structure, to form a ring shape.

An advantage of this embodiment over the first to fourth embodiments is that:

In the segmented and modular wavelength conversion device of this embodiment, by combining two types of modules, namely those using ceramic carriers with reflective layers and phosphor layers on the top surface, and those using fluorescent ceramic pieces with reflective layers on the bottom surface, the applications are broadened which can meet higher design requirements.

Sixth Embodiment

A difference between this embodiment and the first to fifth embodiments is that, a wavelength conversion module in the first to fifth embodiment is replaced with a light transmission segment, or one of them is replaced with a light reflection segment, or both. Other aspects of this embodiment are similar to the first to fifth embodiments, except for the following.

Figure 5A:
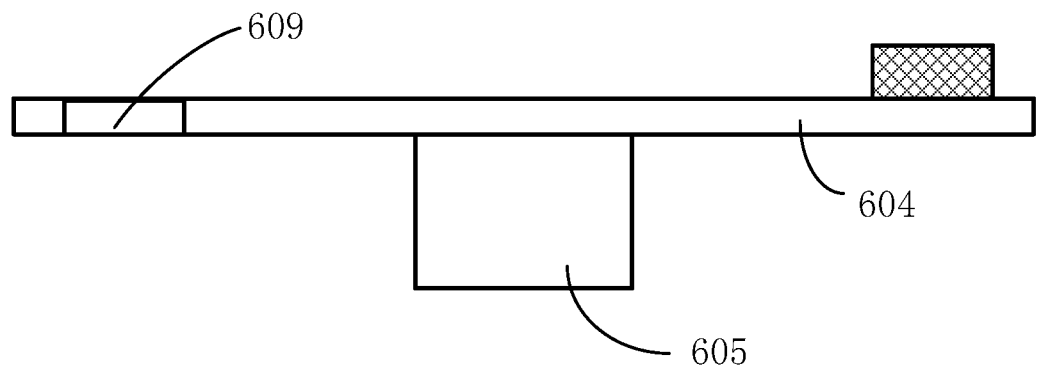
FIG. 5A is a partial cross-sectional view of a wavelength conversion device according to a sixth embodiment of the present invention.

When one wavelength conversion module is replaced by a light transmission segment, as shown in FIG. 5A, an arc shaped region of the base plate of the support structure 604 that corresponds to that wavelength conversion module is cut into an arc shaped opening 609. Or, an arc shaped high transmission glass piece is provided in the opening 609, where the glass piece may be sintered using one of the earlier mentioned glass powders. When the wavelength conversion device is rotated by the drive mechanism 605 to a position such that the excitation light illuminates the arc shaped opening 609, the excitation light passes through the opening 609 directly and becomes output. Thus, the opening is the light transmission region.

Figure 5B:
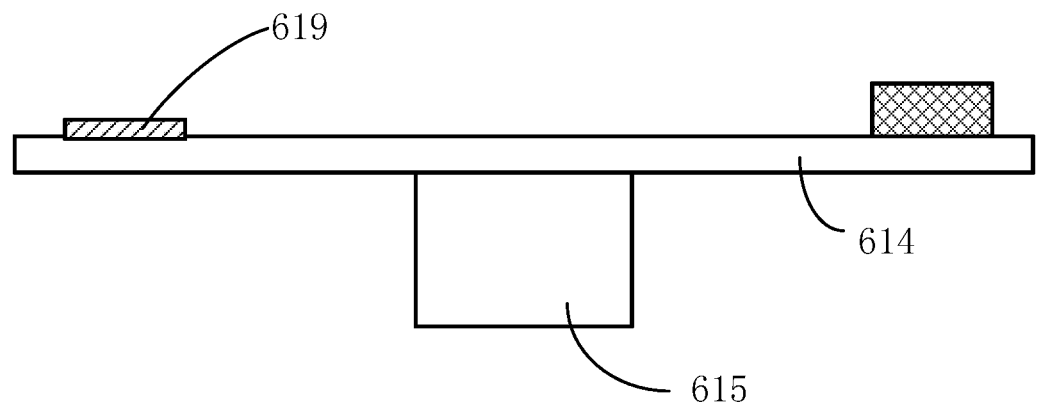
FIG. 5B is a top view of the wavelength conversion device of FIG. 5A.

When one wavelength conversion module is replaced by a light reflection segment, as shown in FIG. 5B, an arc shaped region of the base plate of the support structure 604 that corresponds to that wavelength conversion module is coated with high reflection particles to form a high reflection layer 619. Preferably, to ensure that the high reflection particles are secured adhered to the surface of the support structure 614, the high reflection particles are mixed with silica gel to form a slurry, which is coated on the surface of the support structure 614 and then cured. Further, to increase the reflectivity, a silver-coated aluminum plate having a matching arc shape is prepared first, and then a slurry of the high reflection particles mixed with silica gel is coated on the surface of the silver-coated aluminum plate and then cured. The aluminum plate is then affixed to the corresponding region of the support structure 614, to form the reflection segment. When the wavelength conversion device is rotated by the drive mechanism 615 to a position such that the excitation light illuminates the reflection segment, the excitation light is reflected.

An advantage of this embodiment over the first to fifth embodiments is that, when the excitation light itself is one of the desired monochromatic light such as blue light, it is not necessary to use wavelength conversion of a phosphor of a wavelength conversion module to generate such monochromatic light. Rather, the monochromatic excitation light can be directly transmitted through the transmission segment to be output or reflected by the reflection segment to be collected. This can save materials, simplify fabrication process, and can generate the monochromatic light that has as little light loss as possible.

Seventh Embodiment

A difference between this embodiment and the first to sixth embodiments is that, the support structure of any of the first to sixth embodiments is modified. This embodiment is similar to the first to fifth embodiments except for the following.

Figure 6:
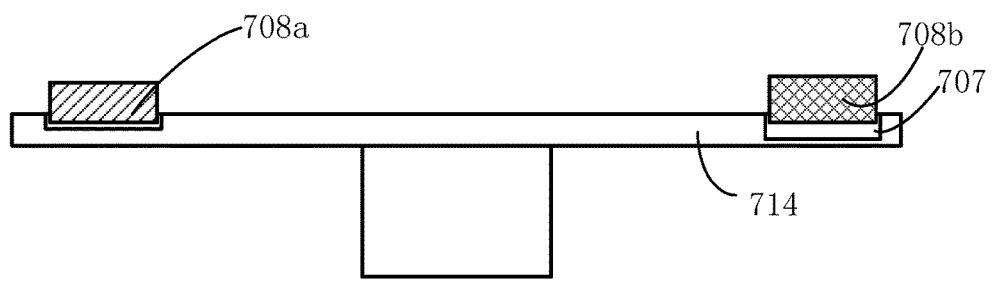
FIG. 6 is a partial cross-sectional view of a wavelength conversion device according to a seventh embodiment of the present invention.

As shown in FIG. 6, the support structure 704 is a round shaped base plate, and a ring shaped groove 707 is formed on the top surface in the ring shaped region that corresponds to where the wavelength conversion modules 708a and 708b are mounted. The wavelength conversion modules 708a and 708b are affixed on the inner bottom surface of the groove 707 using adhesion or soldering as described earlier. Mechanical fastening means may also be used, such as pressing by elastic plates, screws, bolts or other fastening devices, or the wavelength conversion modules can be bucked inside the groove 70 by thermal expansion and contraction of the support structure. The inner and outer side surfaces of the wavelength conversion modules preferably contact the two side surfaces of the groove 707.

An advantage of this embodiment over the earlier embodiments is that, because the wavelength conversion modules are disposed inside the groove, the contact surface areas between the support structure and the wavelength conversion modules are increased, which facilitates heat dissipation of the wavelength conversion modules. Further, when the wavelength conversion modules rotate by the drive mechanism, due to centrifugal force, the wavelength conversion modules have a tendency to be spun outwardly; by placing them inside the groove, the side surface of the groove can protect the modules and prevent them from being spun off, which can improve the structural stability of the wavelength conversion device and increase its life.

Of course, based on the above descriptions, it should be understood that the groove may have many variations, such as two ring shaped protrusions located respectively just inside and just outside of the ring shaped region of the base plate, so that the wavelength conversion modules are located in the ring shaped region between the two protrusions. Or, a number of protrusions may be formed in the ring shaped region of the base plate, and the wavelength conversion modules correspondingly have recesses on their bottoms, such that the protrusions and the recesses engage with each other to form a restraint against radial movements. Or the protrusions and recesses may be swapped. All these designs are within the scope of this embodiment.

Eighth Embodiment

Figure 7A:
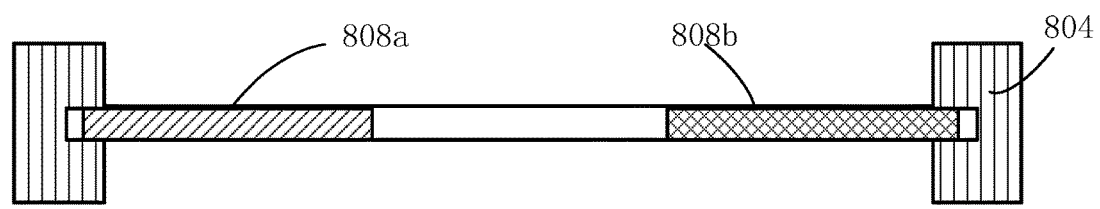
FIG. 7A is a partial cross-sectional view of a wavelength conversion device according to an eighth embodiment of the present invention.

The first to seventh embodiments all use a reflective type wavelength conversion device, so reflective layers are provided on the wavelength conversion modules. The wavelength conversion device of this invention may also be a transmission type, which will not require the reflective layers. Their structures are shown in FIGS. 7A and 7B as examples.

Figure 7B:
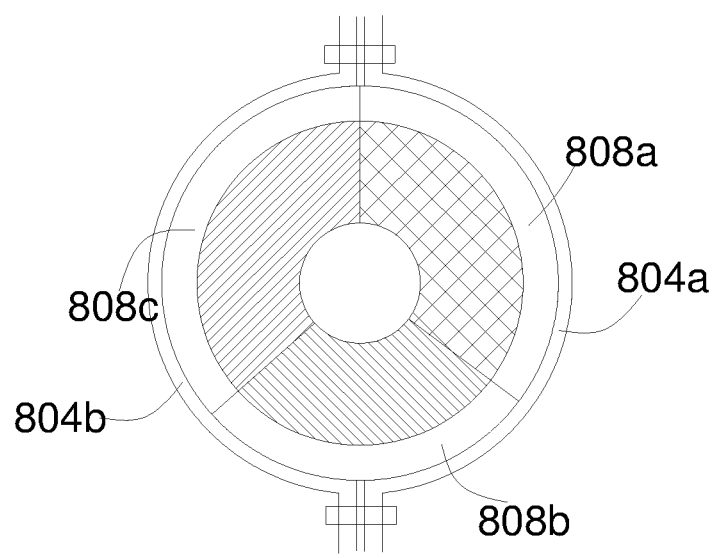
FIG. 7B is a top view of the wavelength conversion device of FIG. 7A.

As shown in FIG. 7B, the support structure 804 includes two half-circle arc shaped slots, which are arranged facing each other and joined together using detachable mechanical means such as threads on the outside surfaces of the support structure components 804a and 804b, elastic snaps, bolting, etc., or joined together using non-detachable means such as adhesion, soldering, etc. As shown in FIGS. 7A and 7B, the outer edges of the multiple wavelength conversion modules 808a, 808b and 808c are inserted into the slot, and the radial direction side edges of adjacent wavelength conversion modules abut each other and help to keep each other in place. The adjacent modules can also be joined to each other by adhesion, soldering, etc. Also, a light transmitting glass plate is provided above and/or below the entire ring shaped combination of wavelength conversion modules, where the edge of the glass plate is inserted into the slot together with the modules. This can improve the overall structural strength of the device and prevent breakage.

The choices and combinations of the wavelength conversion modules may be the same as any of the earlier described embodiments. Also, one of the wavelength conversion modules may be replaced with a light transmitting glass plate or a light transmitting aperture.

To improve the efficiency of the transmitted excitation light and converted light, preferably, a light collection assembly is preferably provided on one side of the round plate formed by the wavelength conversion modules. The light collection assembly may be a flat reflecting mirror, paraboloid reflecting mirror, condensing lens, etc., to collect the light for utilization.

An advantage of this embodiment is that it omits the fabrication step for the reflective layer, and can directly utilize available reflective devices to collect the light. Although under current technologies the efficiency of transmission type devices is lower than reflective type devices, in applications that do not imposed a high requirement on light emitting efficiency, or if the light conversion efficiency of the phosphor layers or fluorescent ceramics can be improved by other means, this embodiment can be an acceptable option.

Ninth Embodiment

A difference between this embodiment and the earlier described embodiments is in the drive mechanism. This embodiment is similar to the first to fifth embodiments except for the following.

In this embodiment, the drive mechanism is coupled to the excitation light source, and drives the excitation light sources to move, so that the emitted excitation light sequentially illuminates different wavelength conversion modules, to sequentially generate different colored converted lights.

When the wavelength conversion modules are stationary, and are arranged in a ring shape, the drive mechanism drives the excitation light source to move laterally along a corresponding circular path. When the wavelength conversion modules have rectangular shapes and are arranged sequentially in a linear manner, the drive mechanism drives the excitation light source to move laterally along a linear path. In the latter case, the drive mechanism is not necessarily a rotating motor, but can be a moving bar, crankshaft, etc. mechanical structure that can generate a linear movement. It should be understood that the wavelength conversion modules may be arranged in any suitable manner depending on need, and the drive mechanism drives the excitation light source in a corresponding manner.

On the other hand, when the excitation light source is stationary, and the drive mechanism is coupled to the support structure and drives the wavelength conversion modules, then depending on the shape of the wavelength conversion modules such as a ring shape, a linear shape, or a wavy shape, the drive mechanism can be provided correspondingly such that the drive mechanism drives the wavelength conversion modules to move in order to sequentially generate different converted lights. In this case, the drive mechanism is not limited to a motor.

An advantage of this embodiment over the earlier described embodiments is that it allows the overall wavelength conversion device to have various different structures to suit the need for various permutations and combinations of the wavelength conversion modules.

The various embodiments of the invention are described in this disclosure in a progressive manner; each embodiment is described by focusing on its difference from other embodiments, while identical or similar aspects of the different embodiments can be understood by referring to other embodiments.

Embodiments of the present invention are not limited to the above; the invention generally relates to a wavelength conversion device that can be illuminated by an incident excitation light to generate converted lights of different wavelengths than the excitation light, which uses a ceramic material as carriers to carry phosphor materials, where the ceramic carriers are divided into multiple segments to reduce and prevent cracking due to high temperature. All such devices are within the scope of this invention.

This invention is also directed to a light source system based on any of the above wavelength conversion devices. The light source system includes an excitation light source generating an excitation light, and the above wavelength conversion device, where the phosphor materials of the wavelength conversion device are located on the light path of the excitation light, to convert the excitation light into converted lights for output.

This invention is also directed to a projection system for forming images, which includes the above light source system. The projection system may use any suitable projection technologies such as liquid crystal display (LCD) and digital light processor (DLP) projection technologies. Moreover, the light emitting device can also be used in lighting systems, such as stage lighting.

It will be apparent to those skilled in the art that various modification and variations can be made in the wavelength conversion device and related systems of the present invention without departing from the spirit or scope of the invention. Thus, it is intended that the present invention cover modifications and variations that come within the scope of the appended claims and their equivalents.

What is claimed is:

1. A wavelength conversion device, comprising a support structure and a plurality of wavelength conversion modules arranged together, wherein each of the plurality of wavelength conversion modules includes a ceramic carrier and a phosphor material attached to a top surface of the ceramic carrier, the ceramic carriers of different wavelength conversion modules being separate pieces of ceramic materials, wherein different phosphor materials are carried by different ceramic carriers, and wherein the support structure keeps the plurality of wavelength conversion modules in fixed positions relative to each other.

2. The wavelength conversion device of claim 1, wherein the phosphor material carried by each ceramic carrier is a phosphor material that is excited to generate a monochromatic converted light.

3. The wavelength conversion device of claim 2, wherein some of the different ceramic carriers carry the same phosphor material.

4. The wavelength conversion device of claim 2, wherein the phosphor material in at least one of the wavelength conversion modules is coated on a surface of the ceramic carrier to form a phosphor layer.

5. The wavelength conversion device of claim 4, wherein the phosphor layer further includes a first glass body that adheres the phosphor material together.

6. The wavelength conversion device of claim 4, wherein the ceramic carriers are made of ceramic materials having thermal conductivities above 80 W/mK.

7. The wavelength conversion device of claim 4, further comprising a reflective layer disposed between the phosphor layer and the surface of the ceramic carrier, wherein the reflective layer is a diffuse reflection layer which includes white scattering particles and a second glass body that adheres the white scattering particles together, or wherein the reflective layer is a total reflection film coated on the surface of the ceramic carrier.

8. The wavelength conversion device of claim 7, wherein the total reflection film is a silver film or an aluminum film.

9. The wavelength conversion device of claim 2, further comprising one or more additional wavelength conversion modules, wherein each additional wavelength conversion module includes a fluorescent ceramic piece formed by the ceramic carrier with the phosphor material dispersed inside.

10. The wavelength conversion device of claim 9, wherein the fluorescent ceramic piece is YAG glass ceramic or sintered YAG ceramic piece.

11. The wavelength conversion device of claim 9, wherein the least one of the additional wavelength conversion modules further includes, on a bottom surface of the fluorescent ceramic piece, a diffuse reflection layer which includes white scattering particles and a second glass body that adheres the white scattering particles together, or a total reflection film.

12. The wavelength conversion device of claim 11, wherein the total reflection film is a silver film or an aluminum film.

13. The wavelength conversion device of claim 11, wherein the least one of the additional wavelength conversion modules further includes a metal protection film over the total reflection film.

14. The wavelength conversion device of claim 1, wherein the support structure includes a base plate, wherein the plurality of wavelength conversion modules are respectively affixed on one surface of the base plate, and wherein the phosphor material is located on a side of each wavelength conversion module that is farther away from the base plate.

15. The wavelength conversion device of claim 14, wherein the base plate is made of a metal, a metal alloy, or a composite material of metal and inorganic materials.

16. The wavelength conversion device of claim 14, wherein the base plate includes a ring shaped groove, and wherein the plurality of wavelength conversion modules each has an arc shape and are arranged together in a ring shape inside the ring shaped groove.

17. The wavelength conversion device of claim 14, wherein the plurality of wavelength conversion modules are affixed to the base plate by adhesion or soldering, and wherein an adhesive agent used for adhesion is an organic adhesive, a silver adhesive or a slurry of silica gel mixed with high thermal conductivity filling particles.

18. The wavelength conversion device of claim 17, wherein the high thermal conductivity filling particles include one or more particles selected from a group consisting of aluminum oxide, aluminum nitride, boron nitride, yttrium oxide, zinc oxide, and titanium oxide.

19. The wavelength conversion device of claim 17, wherein some different ones of the plurality of wavelength conversion modules are affixed to the base plate using different means.

20. The wavelength conversion device of claim 1, further comprising a drive mechanism for driving the support structure to move.

21. A light source system, comprising an excitation light source for generating an excitation light, and the wavelength conversion device of claim 1, wherein the phosphor materials of the wavelength conversion device are located on a light path of the excitation light to convert the excitation light into converted lights for output.

22. A projection system for forming images, comprising the light source system of claim 21.

* * * * *